US012596627B2

(12) United States Patent
Mano et al.

(10) Patent No.:    US 12,596,627 B2
(45) Date of Patent:         Apr. 7, 2026

(54) AGENTLESS SYSTEM AND METHOD FOR DISCOVERING AND INSPECTING APPLICATIONS AND SERVICES IN COMPUTE ENVIRONMENTS

(71) Applicant: CrowdStrike, Inc., Sunnyvale, CA (US)

(72) Inventors: Saar Mano, Givatayim (IL); Amir Sidis, Tel Aviv (IL); Eyal Mamo, Tel Aviv (IL)

(73) Assignee: CrowdStrike, Inc., Sunnyvale, CA (US)

( * ) Notice: Subject to any disclaimer, the term of this patent is extended or adjusted under 35 U.S.C. 154(b) by 1 day.

(21) Appl. No.: 17/655,653

(22) Filed: Mar. 21, 2022

(65) Prior Publication Data

US 2023/0297489 A1      Sep. 21, 2023

(51) Int. Cl.
*G06F 11/3604*          (2025.01)

(52) U.S. Cl.
CPC ................................. *G06F 11/3604* (2013.01)

(58) Field of Classification Search
None
See application file for complete search history.

(56) References Cited

U.S. PATENT DOCUMENTS

| | | | | |
|---|---|---|---|---|
| 6,247,175 | B1* | 6/2001 | Ledford | ................ G06F 8/4435 |
| | | | | 717/157 |
| 9,672,355 | B2 | 6/2017 | Titonis et al. | |
| 10,133,870 | B2 | 11/2018 | Tripp | |
| 10,216,608 | B1* | 2/2019 | Arguelles | ............ G06F 11/3612 |
| 10,482,262 | B2 | 11/2019 | Sharma et al. | |
| 2009/0293049 | A1* | 11/2009 | Gorelkina | .......... G06F 11/3612 |
| | | | | 717/157 |
| 2011/0078507 | A1* | 3/2011 | Choi | .................... G06F 11/3668 |
| | | | | 714/E11.207 |
| 2017/0046399 | A1 | 2/2017 | Sankaranarasimhan et al. | |
| 2021/0281597 | A1* | 9/2021 | Guiroux | .............. H04L 63/1433 |

\* cited by examiner

*Primary Examiner* — Lewis A Bullock, Jr.
*Assistant Examiner* — Mark A Gooray
(74) *Attorney, Agent, or Firm* — Womble Bond Dickinson (US) LLP

(57)              ABSTRACT

A system method for application discovery in a computing environment utilize static analysis. The method includes receiving data of an application, the application deployed on a workload in a first computing environment; detecting a plurality of anchor points in the data; and generating an application graph, including a plurality of first nodes, based on the plurality of anchor points, wherein each anchor point corresponds to a first node, and wherein at least a first node of the plurality of nodes is connected to at least another node of the plurality of nodes.

20 Claims, 5 Drawing Sheets

START

S310

PERFORM STATIC ANALYSIS OF RECEIVED
COLLECTED DATA

S320

DETECT A NEW APPLICATION

300

S330

GENERATE AN INSTRUCTION TO COLLECT
DATA FROM THE NEW APPLICATION

S340

RECEIVE COLLECTED DATA

AGENTLESS SYSTEM AND METHOD FOR DISCOVERING AND INSPECTING APPLICATIONS AND SERVICES IN COMPUTE ENVIRONMENTS

TECHNICAL FIELD

The present disclosure relates generally to discovering and inspecting applications and services in compute environments and specifically to agentless discovery and inspection of applications and services in compute environments.

BACKGROUND

A significant portion of data processing and handling, which effects practically every aspect of our days is handled in cloud based computing environments, such as Amazon® Web Services, Microsoft® Azure and Google® Cloud Platform, just to name a few. What can now be done in cloud based computing environments was not too long ago done on networks which were local, and with their locality came a certain degree of security, insofar as server hardware can be more readily accounted for. Indeed, some organizations today still operate on local networks, having local servers and other compute resources, whether for legacy or security reasons. Other organizations have moved fully into cloud native infrastructure, while a portion of organizations is hybrid, having solutions in both worlds.

Naturally with these various deployments challenges arise, such as getting visibility on the resources in one's organization, as well as architecture drift, which describes the changes made in compute environments that were not part of the deployment plan. For example, a cloud environment may be deployed through declaration code of an infrastructure as code (IaC) platform, such as Terraform®, and once the instances are deployed in the cloud environment, undergo changes for a variety of reasons, such as changing security policies, adding workload types, upgrading versions, etc.

Thus, it becomes difficult for an administrator of such systems, which can be spread across multiple different types of compute environments, to get a clear picture of what is currently active, and how elements in the environment interact with each other.

Prior art solutions which monitor system configuration, require an agent be installed in the systems which should be managed by them. Installing an agent in a production environment leads to complications in deployment, as complex authorizations are typically required and updating versions requires work to be put in by R&D teams to ensure that the agent version does not interfere with normal operation of the production environment. This is not always a practical solution.

An additional complication of monitoring compute environments is in the applications which are executed in the environment. This can include both applications which are organic to an organization (i.e. programmed by owners of the cloud environment) and third party applications, which may be received as executable files or binaries requiring compilation, for example. As the organization scales and grows, monitoring the number of applications, and for each their versions, becomes a difficult problem. For example, it is useful, and may even be required, to know what applications expose which machines to other applications, user accounts, machines, and the like. In certain instances, such as for medical information stored in a cloud computing environment, gaining this exposure knowledge may not only be useful, but could indeed be required by regulation.

It would therefore be advantageous to provide a solution that would overcome at least the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for application discovery in a computing environment utilizing static analysis. The method comprises: receiving data of an application, the application deployed on a workload in a first computing environment; detecting a plurality of anchor points in the data; and generating an application graph, including a plurality of first nodes, based on the plurality of anchor points, wherein each anchor point corresponds to a first node, and wherein at least a first node of the plurality of nodes is connected to at least another node of the plurality of nodes.

Certain embodiments disclosed herein also include a non-transitory computer readable medium having stored thereon causing a processing circuitry to execute a process, the process comprising: receiving data of an application, the application deployed on a workload in a first computing environment; detecting a plurality of anchor points in the data; and generating an application graph, including a plurality of first nodes, based on the plurality of anchor points, wherein each anchor point corresponds to a first node, and wherein at least a first node of the plurality of nodes is connected to at least another node of the plurality of nodes. Certain embodiments disclosed herein also include a system for application discovery in a computing environment utilizing static analysis. The system comprises: a processing circuitry; and a memory, the memory containing instructions that, when executed by the processing circuitry, configure the system to: receive data of an application, the application deployed on a workload in a first computing environment; detect a plurality of anchor points in the data; and generate an application graph, including a plurality of first nodes, based on the plurality of anchor points, wherein each anchor point corresponds to a first node, and wherein at least a first node of the plurality of nodes is connected to at least another node of the plurality of nodes.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
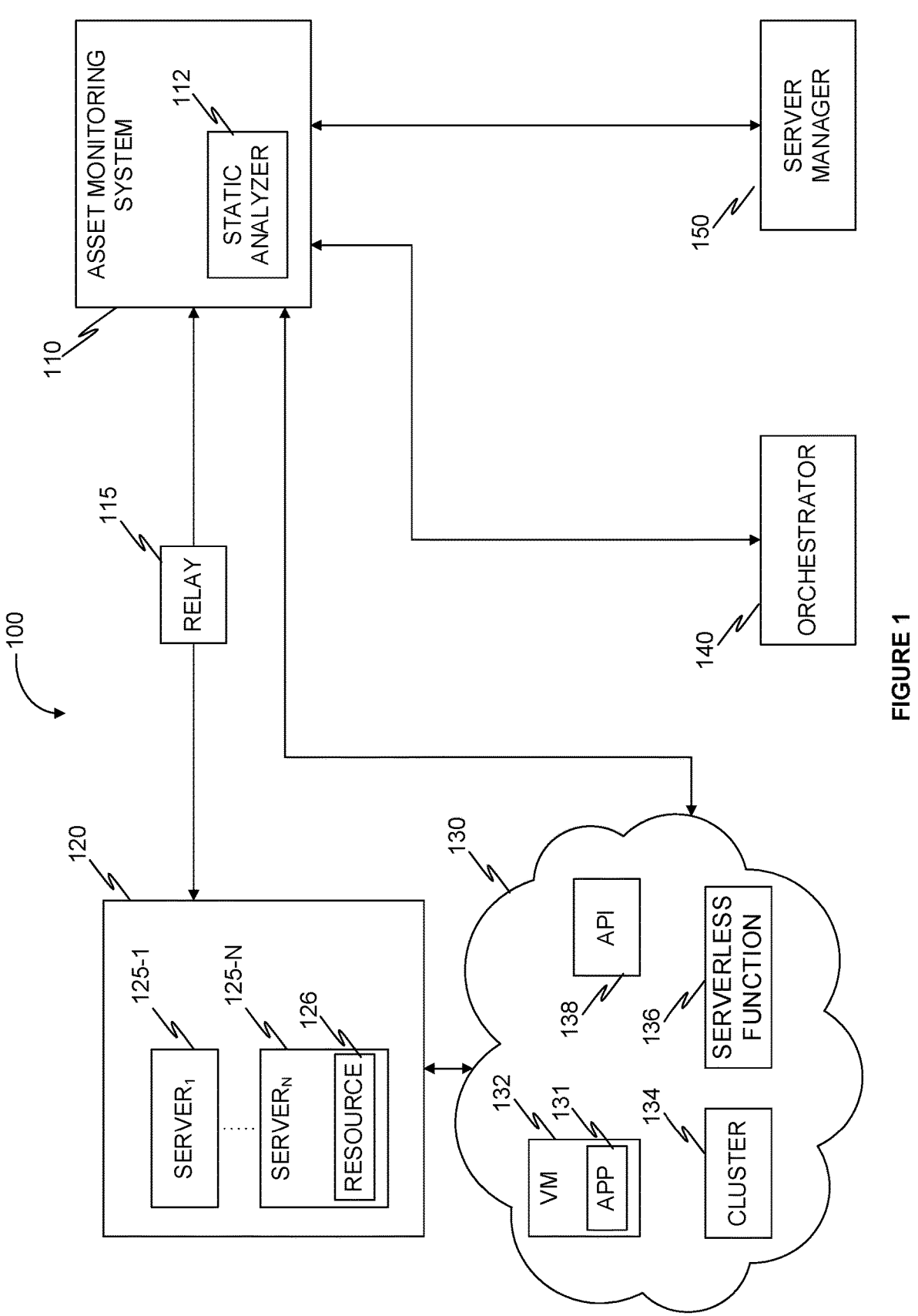
FIG. 1 is a schematic illustration of an asset monitoring system monitoring various compute environments, implemented according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A system method for application discovery in a computing environment utilize static analysis. The method includes receiving data of an application, the application deployed on a workload in a first computing environment; detecting a plurality of anchor points in the data; and generating an application graph, including a plurality of first nodes, based on the plurality of anchor points, wherein each anchor point corresponds to a first node, and wherein at least a first node of the plurality of nodes is connected to at least another node of the plurality of nodes.

Static analysis is a process of analyzing computer code in order for example to validate and optimize computer code, and in certain instances for cybersecurity. One advantage of the techniques disclosed herein includes applying static analysis techniques to computer code of networked computing applications in order to discover communication, data flow, and exposure of applications and between applications in an efficient manner within the network environment. In certain embodiments the techniques disclosed herein provide automated reverse engineering of software in computing environments.

FIG. 1 is an example of a schematic illustration of an asset monitoring system 100 monitoring various compute environments, implemented according to an embodiment. The asset monitoring system 110 (hereinafter 'system 110') is described in more detail in U.S. Non-Provisional application Ser. No. 17/513,117 filed on Oct. 28, 2021, the contents of which are hereby incorporated by reference.

The system 110 is communicatively coupled with a plurality of compute environments, such as first compute environment 120 and to a cloud computing environment 130. While a plurality of compute environments are described in this embodiment, it should be readily apparent that the system 110 may be implemented to communicate with a single compute environment, multiple systems 110 may each be configured to communicate with a single type of compute environment, a system may be implemented in a compute environment, or any combination thereof. A compute environment, such as compute environment 120 may be a cloud computing environment, or other networked environment in which a plurality of workloads, computer devices, such as servers, and the like, may communicate with each other. In certain embodiments, the system 110 may connect to a compute environment via a relay 115, which is used to direct network traffic.

The system 110 may be implemented as a virtual appliance, for example an Open Virtualization Appliance (OVA) in VMware®. Such a virtual appliance may be deployed in a cloud environment, such as the cloud environments described below. In an embodiment the system 110 may be executed on a container running in a Kubernetes® cluster.

For example, the system 110 is connected to a first compute environment 120 through a relay 115. The first compute environment 120 is a closed network, and includes a plurality of computer servers 125, or individually server 125-1 through 125-N, where 'N' is an integer having a value of '2' or more. Each server 125 is a computer, and includes at least a processing circuitry, memory, and network interface. Some compute environments similar to the first compute environment 120 may require an asset monitoring system 110 to be installed physically in the compute environment 120. In an embodiment, the system 110 may communicate with a server 125 utilizing a secure network protocol, such as SSH (secure shell), using account login information provided to the system 110. The login information may include a username and password, wherein the account is authorized to install executable code files on the server 125.

A server 125 may further have stored thereon a resource, such as resource 126 which is stored on server 125-N. A resource 126 may be, for example, a database, a webpage, an image, a multimedia file, a software code, and the like. A resource 126 may be accessed by generating a request for a uniform resource locator (URL), which is unique to the resource 126.

The system 110 is further communicatively connected to a cloud computing environment 130. The cloud computing environment 130 may be, or may be implemented using, for example, Amazon® Web Services (AWS), Microsoft® Azure, Google® Cloud Platform (GCP), and the like. For example, the cloud computing environment 130 may be a virtual private cloud (VPC) environment, implemented on top of infrastructure provided by AWS or Azure.

The asset monitoring system 110 is operative for collecting data from compute environments, analyzing the collected data, and discovering applications and communications between such applications. An example implementation of such a system is further discuss in U.S. patent application Ser. No. 17/513,117, the entire contents of which are incorporated herein by reference.

The cloud computing environment 130 may include various workloads. A workload may be a virtual machine 132, a container cluster 134, a serverless function 136, and the like. Virtual machines may be implemented, for example utilizing VMware®. Container clusters can be implemented utilizing Kubernetes®. A serverless function can be implemented, for example using Amazon® Lambda. The cloud computing environment 130 further includes an application programming interface (API) through which various functions of the cloud computing environment 130 may be accessed or requested.

For example, an application 131 executed on the virtual machine 132 may request, via a URL request, a resource 126 provided by a server 125-N. The request may originate from code instructions of the application 131, which require periodical access to the resource 126. For example, the application 131 may include a URL request to periodically check with a third party server (i.e. server 125-N) to determine if a version of the application 131 is a current version, and if not, download code from the third party server which when executed by the virtual machine would cause the installation of an updated version of the application 131.

The system 110 may further be communicatively connected to an orchestrator 140, and a server manager 150. The orchestrator 140 is a component of a cloud computing environment. An orchestrator may be, for example, Amazon® Elastic Container Service (ECS), or Azure App Service. A server manager (or server management system) may be, for example, Chef® EAS, Puppet®, Ansible®, Azure® Automation, and the like.

The asset monitoring system 110 is configured to communicate with each compute environment and extract data from the workloads thereon, for example using collector applications. For example, the system 110 may initiate an SSH connection to a server 125, and cause the server 125 to install a collector application (not shown).

The collector application (or simply "collector") is programmed to open a communication channel to the system 110 and provide over the communication channel data collected from the server 125 on which it is installed. When the collector has finished sending the required data, the collector is configured to remove itself from the server 125. Different methods of operating collectors are discussed below.

The collected data may be provided to a static analyzer 112. While a single static analyzer 112 is disclosed in this embodiment, this is for simplicity and pedagogical purposes only, and is not meant as a limitation. Indeed in some embodiments a plurality of static analyzers may be deployed. In certain embodiments, each static analyzer may include a type. For example, a first group of static analyzers may be of a first type, a second group of static analyzers may be of a second type, and so on. A type of static analyzer may be, for example, a static analyzer for any of: Java code, Python code, and the like.

The static analyzer 112 may be implemented as an application (e.g. software) running on the asset monitoring system 110, or as another workload communicatively connected to the asset monitoring system 110. The static analyzer 112 may be configured to receive data from a collector. In some embodiments the static analyzer 112 may receive the data directly from the collector, while in certain embodiments the data may be received from the asset monitoring system 110 which in turns receives the data from the collector. Collected data may include binary code of an application on the workload, a software library, an error log, a script code, a configuration file, credentials, and the like.

Figure 2:
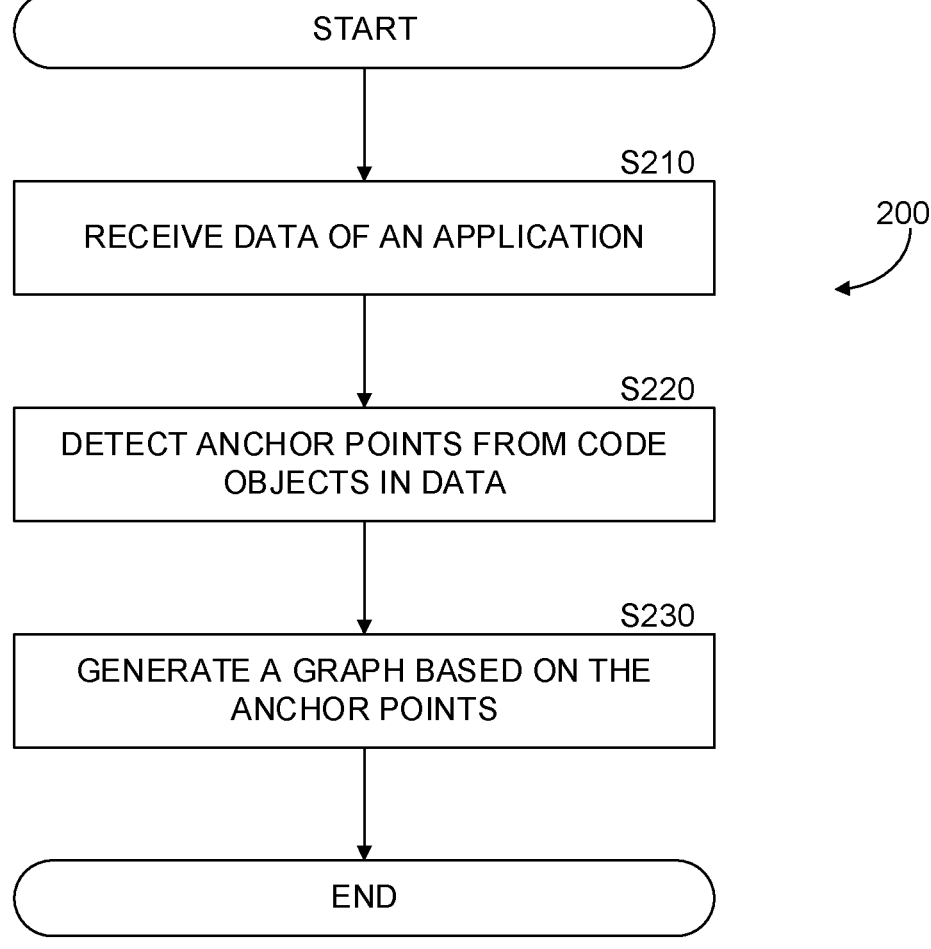
FIG. 2 is flowchart of a method for performing static analysis for application discovery, implemented in accordance with an embodiment.

FIG. 2 is an example of a flowchart 200 of a method for performing static analysis for application discovery, implemented in accordance with an embodiment.

At S210, data of an application is received. The data may be, for example, binary code, declaratory code, script code, error log(s), configuration file(s), credential(s), and the like. In an embodiment the data may be received by a static analyzer from a collector. The application may be executed on a machine on which the collector is installed. In certain embodiments, the static analyzer may further decompile data in order to generate code which can be analyzed by the static analyzer. In some embodiments the static analyzer may further receive runtime data, which may include information logs, files, and other artifacts such as temporary files, which are all generated by an application which is currently running.

At S220, anchor points are detected in the data. Detecting anchor points may include detecting a plurality of objects and relationships in the data. For example, a plurality of code objects may be detected in code. A data object may, for example, a function. A first function may call a second function, for example a function from a library. Thus, the first function and the second function share a 'call' relationship, which in this example is directional (i.e. the first function calls the second function, but the second function does not call the first function).

A static analyzer may search the data (e.g. code) for anchor points. An anchor point may include, for example, an indicator of a function name (such as parentheses), tags (such as in hypertext markup language—HTML), and the like. Anchor points may be determined according to a set of heuristics, and is used to determine for example which code objects are of interest. For example, an anchor point may be a function that calls a database, a REST (REpresentational State Transfer) API (application programming interface) call, service request, and the like. These code objects are of interest as they indicate how an application communicates and with what other resources and principals it communicates with.

At S230, a graph is generated based on the detected anchor points. In an embodiment the graph may be generated by the static analyzer. Generating a graph based on anchor points is an efficient way to achieve soundness in describing an application using a graph. Generating a graph based on all detected code objects can be a cost prohibitive action, as it may require excessive processing and memory. However, by generating a graph based on anchor points, the important functionality of an application is captured, utilizing only necessary processing and memory.

For example, for each anchor point the static analyzer may determine what other code objects have a relationship with the anchor point. The other code objects and their relationships may be mapped to the graph. Additional code objects may be detected which have relationships with the other code objects, and the additional code objects mapped to the graph, and so on. Thus, the graph is generated from the anchor points, rather than mapping each and every code object, whether it is significant or not.

In certain embodiments, determining a relationship between another code object and an anchor point may further be performed based on collected data, such as collected runtime data. For example, the application code may indicate that a first function can call a database, but there is no indication in the collected runtime data of the first function calling the database.

In an embodiment the detected objects and relationships are mapped to a graph based on a predefined data schema. The data schema may define data types, for example, a function, and include data attributes, such as identifier(s), possible connections, and the like. Each node in the graph may correspond to an object, while relationships are defined by having an edge connecting the nodes for which the relationship is defined. An edge may have a weight, and may be of a predefined type. In an embodiment, a first node and a second node in a graph may be connected by a plurality of edges, each edge indicating a different type of connection.

In some embodiments, paths are generated to determine if an anchor point can be arrived at from a first code object. Generating a path from a first object (i.e. anchor point) to a second object may include generating a simulation based on received code. The received code may cause an input to be manipulated into an output. For example, the code may cause an HTTP (hypertext transfer protocol) URL request to be substituted with an HTTPS (HTTP secure) URL request before being routed. By naively following the input (i.e. HTTP request) the static analyzer may not perform the connection that the input has been transformed and lose the request at the next time it is used. However, by simulating an input for the code, the static analyzer may determine that the input has been transformed. The input, transformed input, and code objects may all be stored in the graph.

Static analysis may be performed in conjunction with dynamic analysis. Dynamic analysis may include, for example, analyzing data artifacts, such as network logs, to determine, for example, how a first application communicates with a second application. However, dynamic analysis at best can yield only what an application has already exposed (e.g. with which applications and machines it communicates) but does not necessarily yield all possible communication. In the example of an application which periodically corresponds with a third party server to determine if a new version is available, the communication may occur once every 30 days, while the dynamic analysis is performed on a window of 7 days' worth of communication logs. Thus, dynamic analysis alone may miss information which is available through static analysis.

Figure 3:
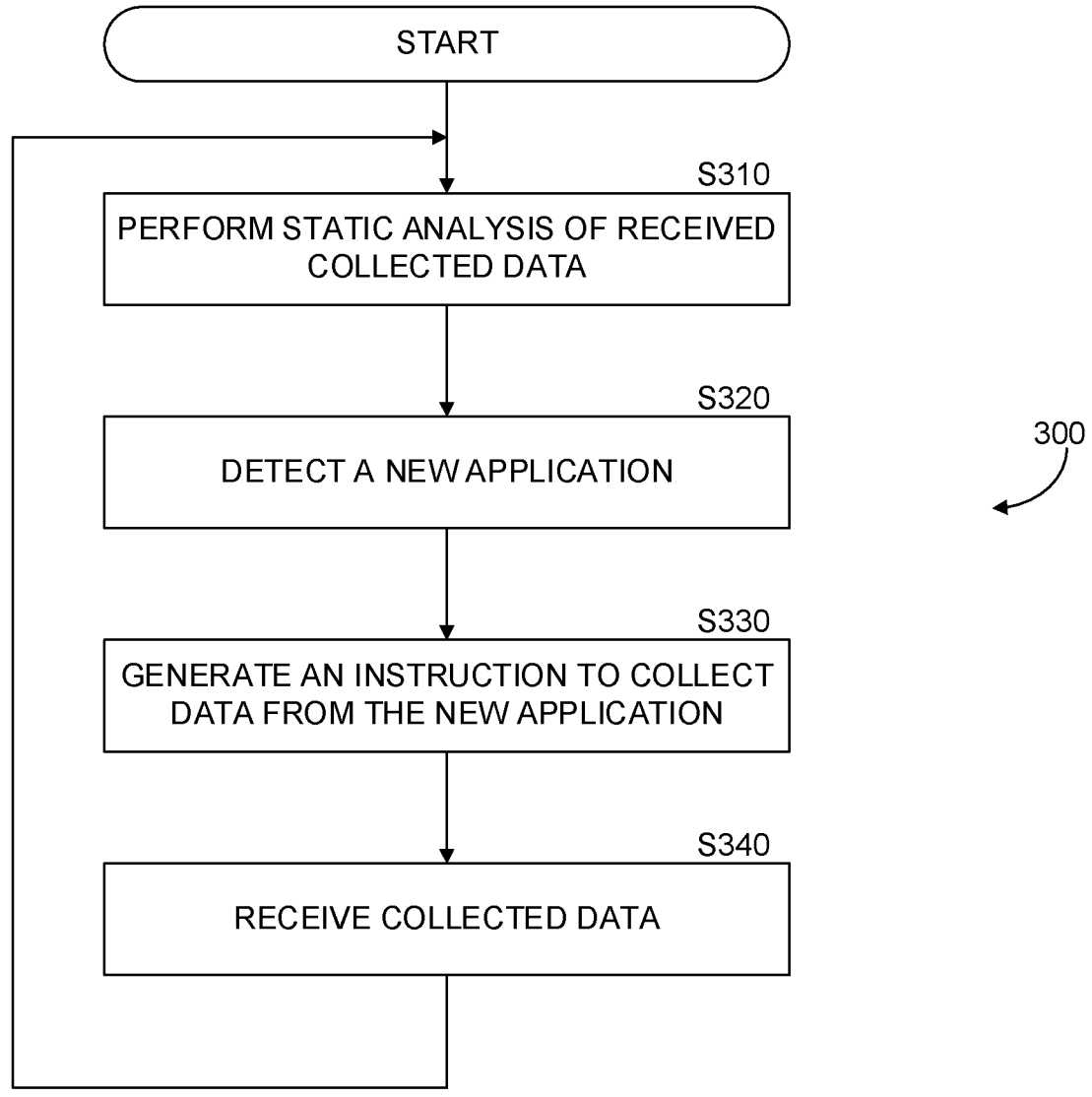
FIG. 3 is a flowchart of a method for looping collection and static analysis in application discovery, implemented in accordance with an embodiment.

FIG. 3 is an example flowchart 300 of a method for looping collection and static analysis in application discovery, implemented in accordance with an embodiment.

At S310, static analysis of data is performed. In an embodiment, static analysis may be performed according to the methods disclosed herein, for example the method of FIG. 2 above.

At S320, an application is detected. For example, an application may be detected by the static analyzer, which determines that analysis of received code indicates that the code calls (or communicates) with the detected application. A detected application may be executed on a machine which an asset monitoring system is not aware of. An asset monitoring system may be aware of a machine if the system has previously performed an operation which resulted in data collection from the machine. The machine may be, for example, a virtual machine, a node in a container, a server-less function, and the like.

At S330, an instruction is generated to collect data from the machine of the detected application. The instruction may further include instructions to collect data corresponding to the detected application.

At S340 the collected data is received. The collected data may be received for example by a static analyzer. In such an embodiment, execution may continue at S310, to perform static analysis of the collected data. Thus, an asset monitoring system may continuously discover new applications, and disperse collectors to collect data from sources (such as machines) of the new applications.

Figure 4:
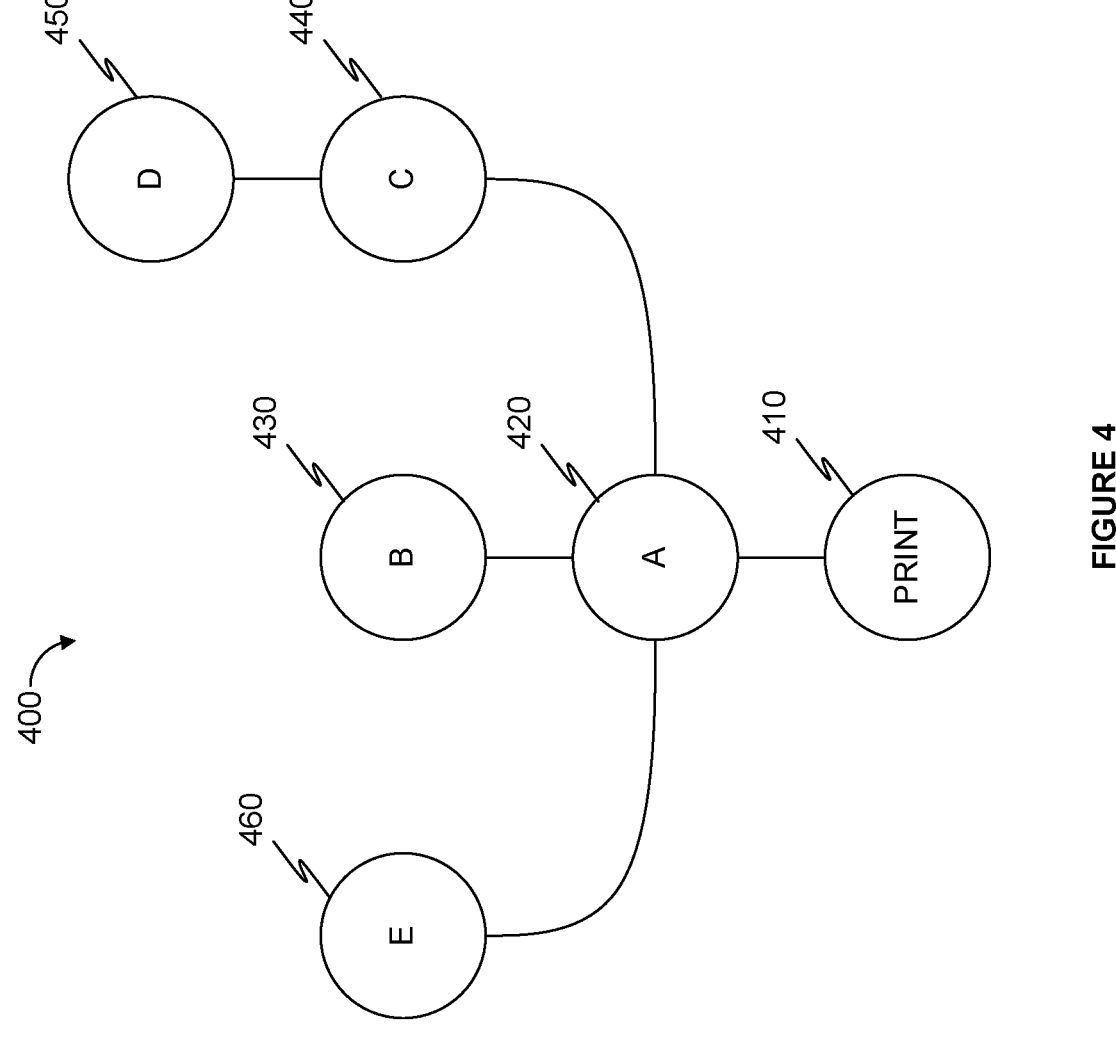
FIG. 4 is a graph generated based on an application, in accordance with an embodiment.

FIG. 4 is an example of a graph 400 generated based on an application, in accordance with an embodiment. The application includes computer code, which may include a plurality of functions. Each function may be represented on the graph 400, indicating possible flows between the functions. In this example, the print function node 410 represents a print function. The print function node 410 is determined to be an anchor point by a static analyzer. The graph 400 represents the following code from the application:

```
void A(int x) {
print (x);
}
void B( ) {
A(1)
}
void C(int y) {
A(y)
}
void D( ) {
C(2)
}
void E( ) {
A(3)
}
```

The functions B 430 and C 440 both call function A 420, which in turn calls the print function 410. Function D 450 calls function C 440, thus, there is a path from function D 450 to the anchor point of the print function 410. The application may include dead code, i.e. code which is present in the application but does not perform any actual function, as there is no execution path that leads to the code being executed. For example, if no part of the application calls function E 460, then while there may be a theoretical execution path from function E 460 to the print function 410, in practice the execution path is not viable. Therefore, the node of function E 460 and edge connecting function E 460 to function A 420 may be removed from the graph 400.

An advantage of the disclosed embodiments is that reducing the size of the graph only to paths which are actually executable in practice reduces the storage space required to store the graph, and computation whenever the graph is traversed. The graph is also an accurate representation of the application, as it does not show paths which are not executable.

Another example of computer code is provided, in which the static analyzer searches for a "HttpClient.send" routine. The application computer code includes:

```
void sendRequest(String url) {
    HttpClient.send (url, "request");
}
void sendRequestInternal(String url) {
    if (url==null) {
        url=System.getEnv("DEFAULT_URL");
    }
    sendRequest(url);
}
void testMock( ) {
    sendRequest ("www.test.com");
}
String getUrl ( ) {
    String url=null;
    if (DB.connectionAvailable( )) {
        url=DB.getUrl( );
    }
    return url;
}
void validateInternetConnectivity( ) {
    String ext="com";
    sendRequest ("www$google$".replace ('$', '.')+ext);
}
void main( ) {
    String url=getUrl( );
    validateInternetConnectivity( );
    sendRequestInternal(url);
}
```

In this example the static analyzer will find the combinations of URL and request payload that are being passed to that function and thus are considered as network requests that are being sent out of the application to that specific host. Based on a generated graph of this computer code example, the static analyzer may determine that a request is sent to "www.google.com" URL with the payload "request", through the 'validateInternetConnectivity' routine. The URL string is generated using a complex chain, which the static analyzer may evaluate by using symbolic execution (simulation).

The static analyzer may further determine that a request is sent to a URL that is given by the 'DEFAULT_URL' environment variable, with the payload "request", through the 'sendRequestInternal' routine. The actual value of the environment variable can be placed later on using runtime data collected from the application process.

The static analyzer further determines that the "testMock" routine would never be executed since there isn't any flow towards it from the "main" routine which is considered as an entry point in this particular example. Thus, the static analyzer would not consider "www.test.com" as a request.

Figure 5:
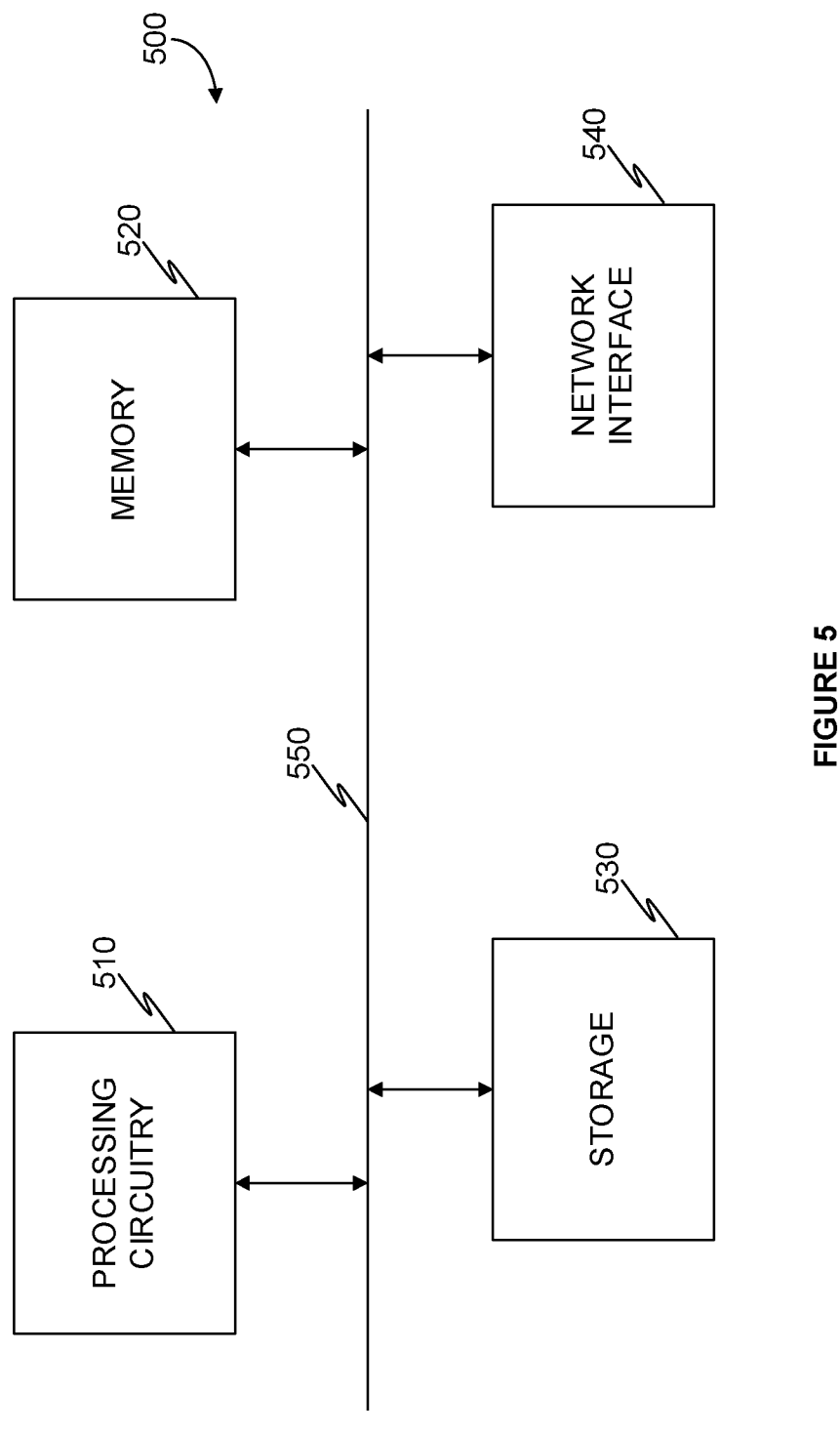
FIG. 5 is a schematic diagram of a static analyzer according to an embodiment.

FIG. 5 is an example schematic diagram of a static analyzer 500 according to an embodiment. The system 500 includes a processing circuitry 510 coupled to a memory 520, a storage 530, and a network interface 540. In an embodiment, the components of the system 500 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, or any other medium which can be used to store the desired information.

The network interface 540 allows the system 500 to communicate with, for example, various workloads, and collectors installed on the various workloads across different compute environments.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method, comprising:
installing a collector computer code in a workload;
receiving, from the collector computer code, data of an application that is deployed on the workload in a first computing environment;
detecting a plurality of code objects in the data of the application;

determining that a first set of code objects in the plurality of code objects corresponds to anchor points of the application, the anchor points are functions indicating how the application communicates with one or more resources;

determining a second set of code objects of the plurality of code objects that have a direct relationship with the first set of code objects corresponding to anchor points;

generating, by processing circuitry, an application graph, including a plurality of first nodes, based on the first set of code objects corresponding to the anchor points, a plurality of second nodes based on the second subset of code objects, and a plurality of third nodes based on the second subset of code objects, wherein an initial second node of the plurality of first second nodes is exclusively connected to an initial first node of the plurality of first nodes that and is upstream relative to the second initial first node, and an initial third node of the plurality of third nodes is exclusively connected to the initial second node of the plurality of second nodes and is upstream relative to the initial second node, the application graph comprising a first portion of executable code associated with a first function and a second portion of executable code associated with a second function;

determining that the first portion of executable code in the application graph executes to perform the first function when traversing the application graph, wherein the first portion corresponds to the first initial second node;

determining that the second portion of the executable code in the application graph does not execute to perform the second function when traversing the application graph from the first node to the second node, wherein the second portion corresponds to the second initial third node;

in response to determining that the second portion of the executable code in the application graph does not execute to perform the second function, reducing an amount of computing resources to traverse the application graph by removing the second portion of the executable code from the application graph; and traversing the application graph using the amount of computing resource responsive to removing the second portion of the executable code from the application graph.

2. The method of claim 1, wherein the application is to interact with a second application, wherein the second application is deployed on a second workload.

3. The method of claim 2, wherein at least one of the data comprises computer executable code or a first anchor point of the anchor points is a code object in the computer executable code.

4. The method of claim 3, wherein the first anchor point is detected from the application, and a second anchor point is detected in the second application, wherein the first anchor point and the second anchor point are connected to each other in the application graph.

5. The method of claim 1, further comprising:

discovering that the application communicates with a second application executing on a machine which an asset monitoring system is not aware of;

deploying a collector computer code on the machine, the collector computer code to collect further data of the second application from the machine;

removing the collector from the machine upon determining that transmission of the further collected data is complete; and updating the application graph based on further anchor points in the collected data received from the further collector deployed on the machine.

6. The method of claim 1, further comprising:

updating the application graph with a plurality of secondary nodes, each secondary node representing an object which has a relationship with a particular anchor point.

7. The method of claim 6, further comprising:

receiving runtime data of the application; and determining the relationship between each secondary node and the particular anchor point based on the runtime data.

8. The method of claim 1, further comprising:

generating a path based on the application graph between a node representing a first anchor point and a node representing a second anchor point, wherein the path indicates that data flows in the application from the first anchor point to the second anchor point.

9. The method of claim 1, further comprising:

generating a dynamic analysis of the application.

10. The method of claim 1, wherein each anchor point of the anchor points of the application is at least one of a function calling a database, a representational state transfer (REST) application programming interface (API) call, or a service request.

11. A non-transitory computer readable medium storing instructions that, when executed by a processing device, cause the processing circuitry to:

install a collector computer code in a workload;

receive, from the collector computer code, data of an application that is deployed on the workload in a first computing environment;

detect a plurality of anchor points in the data of the application;

determine that a first set of code objects in the plurality of code objects corresponds to anchor points of the application, the anchor points are functions indicating how the application communicates with one or more resources;

determine a second set of code objects of the plurality of code objects that have a direct relationship with the first set of code objects corresponding to anchor points;

generate, by the processing circuitry, an application graph, including a plurality of first nodes, based on the first set of code objects corresponding to the anchor points, a plurality of second nodes based on the second subset of code objects, and a plurality of third nodes based on the second subset of code objects, wherein an initial second node of the plurality of first second nodes is connected to an initial first node of the plurality of first nodes that and is upstream relative to the second initial first node, and an initial third node of the plurality of third nodes is exclusively connected to the initial second node of the plurality of second nodes and is upstream relative to the initial second node, the application graph comprising a first portion of executable code associated with a first function and a second portion of executable code associated with a second function;

determine that the first portion of executable code in the application graph executes to perform the first function when traversing the application graph, wherein first portion corresponds to the first initial second node;

determine that the second portion of the executable code in the application graph does not execute to perform the second function when traversing the application graph from the first node to the second node, wherein the second portion corresponds to the second initial third node;

in response to determining that the second portion of the executable code in the application graph does not execute to perform the second function, reducing an amount of computing resources to traverse the application graph by removing the second portion of the executable code from the application graph; and traverse the application graph using the amount of computing resource responsive to removing the second portion of the executable code from the application graph.

12. A system, comprising:

a memory; and a processing circuitry that is operatively coupled to the memory, to:

install a collector computer code in a workload;

receive, from the collector computer code, data of an application that is deployed on the workload in a first computing environment;

detect a plurality of anchor points in the data of the application;

determine that a first set of code objects in the plurality of code objects corresponds to anchor points of the application, the anchor points indicating how the application communicates with one or more resources;

determine a second set of code objects of the plurality of code objects that have a direct relationship with the first set of code objects corresponding to anchor points;

generate an application graph, including a plurality of first nodes, based on the first set of code objects corresponding to the anchor points, a plurality of second nodes based on the second subset of code objects, and a plurality of third nodes based on the second subset of code objects, wherein an initial second node of the plurality of first second nodes is connected to an initial first node of the plurality of first nodes that and is upstream relative to the second initial first node, and an initial third node of the plurality of third nodes is exclusively connected to the initial second node of the plurality of second nodes and is upstream relative to the initial second node, the application graph comprising a first portion of executable code associated with a first function and a second portion of executable code associated with a second function;

determine that the first portion of executable code in the application graph executes to perform the first function when traversing the application graph, wherein the first portion corresponds to the first initial second node;

determine that the second portion of the executable code in the application graph does not execute to perform the second function when traversing the application graph from the first node to the second node, wherein the second portion corresponds to the second initial third node;

in response to determining that the second portion of the executable code in the application graph does not execute to perform the second function, reduce an amount of computing resources to process the application graph by removing the second portion of the executable code from the application graph; and traverse the application graph using the amount of computing resource responsive to removing the second portion of the executable code from the application graph.

13. The system of claim 12, wherein the application is configured to interact with a second application, wherein the second application is deployed on a second workload.

14. The system of claim 13, wherein at least one of the data comprises computer executable code or a first anchor point of the plurality of anchor points is a code object in the computer executable code.

15. The system of claim 14, wherein the processing circuitry is further to:

detect the first anchor point from the application, and detect a second anchor point in the second application, wherein the first anchor point and the second anchor point are connected to each other in the application graph.

16. The system of claim 12, wherein the processing circuitry is further to:

discover that the application communicates with a second application executing on a machine which an asset monitoring system is not aware of;

deploy a collector computer code on the machine, the collector computer code configured to collect further data of the second application from the machine;

remove the collector from the machine upon determining that transmission of the further collected data is complete; and update the application graph based on further anchor points in the collected data received from the further collector deployed on the machine.

17. The system of claim 12, wherein the processing circuitry is further to: update the application graph with a plurality of secondary nodes, each secondary node representing an object which has a relationship with a particular anchor point.

18. The system of claim 17, wherein the processing circuitry is further to:

receive runtime data of the application; and determine the relationship between each secondary node and the particular anchor point based on the runtime data.

19. The system of claim 12, wherein the processing circuitry is further to: generate a path based on the application graph between a node representing a first anchor point and a node representing a second anchor point, wherein the path indicates that data flows in the application from the first anchor point to the second anchor point.

20. The system of claim 12, wherein each anchor point of the anchor points of the application is at least one of a function calling a database, a representational state transfer (REST) application programming interface (API) call, or a service request.

* * * * *